United States Patent [19]

Sharpe

[11] 3,892,190

[45] July 1, 1975

[54] THERMAL OXIDATION OF WASTES AND APPARATUS THEREFOR

[75] Inventor: Peter S. Sharpe, Joliet, Ill.

[73] Assignee: Brule' C. E. & E., Inc., Blue Island, Ill.

[22] Filed: Apr. 1, 1974

[21] Appl. No.: 457,102

Related U.S. Application Data

[63] Continuation-in-part of Ser. No. 289,095, Sept. 14, 1972, Pat. No. 3,805,714.

[52] U.S. Cl. ................ 110/8 R; 110/7 S; 110/28 F; 110/119

[51] Int. Cl. .............................................. F23g 3/00

[58] Field of Search ........... 110/7 R, 7 S, 8 R, 28 F, 110/119, 18 R

[56] References Cited

UNITED STATES PATENTS

| | | | |
|---|---|---|---|
| 3,395,654 | 8/1968 | Weisberg | 110/8 R |
| 3,504,481 | 4/1970 | Zakarian et al. | 110/119 |
| 3,520,113 | 7/1970 | Stokes | 110/119 |
| 3,805,714 | 4/1974 | Sharpe | 110/28 F |

*Primary Examiner*—Kenneth W. Sprague
*Assistant Examiner*—James C. Yeung
*Attorney, Agent, or Firm*—Thomas W. Speckman

[57] ABSTRACT

A process and apparatus for thermal oxidation of gaseous, liquid and solid wastes by passing air spirally around the exterior length of a cylindrical oxidation vessel countercurrent to the direction of flow of combustion gases within the chamber and toward the feed end of the oxidation chamber to pre-heat said air; introducing the pre-heated air in rotating motion through tangential air ports toward the periphery from the center of the feed end of the oxidation chamber so that the air moves in a spiral and rotating motion to the exhaust end of the oxidation chamber; introducing fuel which may be liquid or gaseous or mixed and may include high energy waste for thermal oxidation through a port or ports in the central portion of the feed end of the oxidation chamber; igniting the fuel near the introduction ports and if desired introducing low energy gas, liquid or solid waste through a port or ports in the central portion of the feed end of the oxidation chamber; passing the fuel, air and waste through the oxidation chamber in an intimate mixing, spiral, rotating motion at low-pressure to effect high-efficiency oxidation of the waste in the central portion of the oxidation chamber, the vessel walls of the oxidation chamber being cooled by excess air moving spirally in the peripheral portion of the oxidation chamber; and passing the products of oxidation and excess air from the oxidation chamber through an open exhaust end. The oxidation chamber in combination with a water scrubber and fail-safe exhausting means provides a chemical waste disposal apparatus resulting in minimal pollution.

11 Claims, 1 Drawing Figure

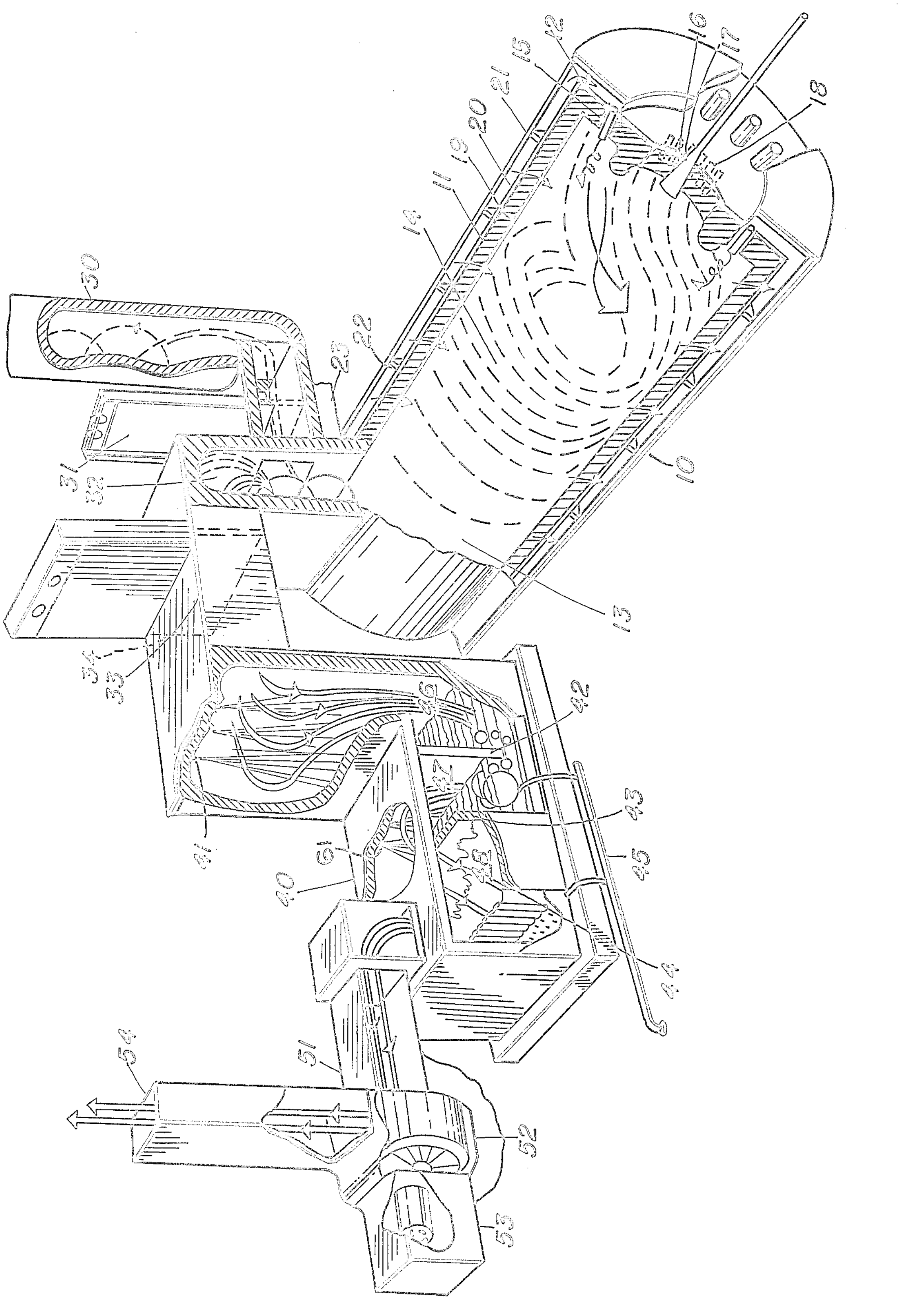

THERMAL OXIDATION OF WASTES AND APPARATUS THEREFOR

CROSS REFERENCE TO RELATED APPLICATION

This is a continuation-in-part application to my pending application Ser. No. 289,095, filed Sept. 14, 1972 U.S. Pat. No. 3,805,714, entitled Process of Burning and Apparatus Therefor.

The expansion of chemical production and the increasing requirements for the minimization of air pollution make it mandatory that more efficient methods of satisfactory disposal of undesired effluent chemicals be placed in operation. The present invention provides an apparatus and process for highly efficient thermal oxidation of undesired chemicals to minimize air pollution. It has been known in the chemical industry that thermal oxidation is an efficient manner of rendering many chemical wastes non-air polluting, but adequate methods and apparatuses, especially when the waste is in liquid or solid form, have not previously been available.

This invention relates to a process and apparatus for the high efficiency thermal oxidation and combustion of liquid, gaseous and solid wastes either separately or in combination. The process and apparatus of this invention effects high efficiency oxidation of a wide variety of wastes reducing undesired stack effluent, thereby minimizing problems of pollution of the atmosphere. Further, the process and apparatus of this invention provide high efficiency oxidation while operating at low pressures thereby minimizing power consumption and noise. The process and apparatus of this invention also provide extended furnace life and minimize furnace maintenance through the cooling of the walls of the furnace both on their exterior surfaces and on their interior surfaces.

An important object of the process and apparatus of this invention is to provide a method and apparatus wherein liquid, gaseous and solid chemical wastes may be oxidized with high efficiency in the same unit either together or separately. The solid wastes may be slurried in water or other carrier liquid. The process and apparatus of this invention has been found highly efficient in the oxidation of such slurries containing a high percentage of water.

A preferred embodiment of an apparatus of this invention is illustrated in the drawing wherein:

FIG. 1 is a partial sectional perspective view of an apparatus embodying the principles of this invention.

The thermal oxidizer is shown as 10 in FIG. 1. The thermal oxidizer comprises cylindrical oxidation vessel wall 11, having closed feed end 12 and open exhaust end 13 defining oxidation chamber 14. Closed end 12 has air ports 15 tangential to the axis of chamber 14 and toward the periphery from the center of feed end 12. The number of air ports 15 toward the periphery of feed end 12 is not critical, but must be adequate to furnish sufficient air for oxidation and combustion with an excess of air for cooling the oxidation chamber walls. Liquid port 16 is located in the central portion of feed end 12 and has nozzle 17 which provides for injection of liquid fuels and wastes and waste solid containing slurries in a manner which provides conical distribution as the waste progresses away from the nozzle through combustion chamber 14. Nozzle 17 represents a single nozzle, but multiple nozzles are also suitable. Surrounding central liquid port 16 and spaced about the central portion of feed end 12 are a series of gas ports 18 providing injection of gaseous fuel or waste which may be in the same general tangential direction as air from tangential ports 15 or may be parallel to the longitudinal axis of the oxidation chamber. The number of gas ports 18 is not critical but must be adequate to furnish sufficient gaseous fuel for efficient combustion and oxidation when gaseous fuel is utilized.

Cylindrical oxidation vessel wall 11 is shown comprised of fire-brick lining 19 and outside the fire-brick may be a circumferential support of non-insulating material 20. Jacket 21 surrounds the cylindrical oxidation vessel and is spaced therefrom. Baffles 22 are positioned in the space between jacket 21 and vessel wall 11 so that when air is forced into the space between the jacket and vessel walls at entrance 23 the air is spirally directed along the exterior of the oxidation vessel toward feed end 12, as shown by the arrows, preheating the air and cooling the exterior of the oxidation vessel. Air is supplied to entrance 23 by a supply blower, not shown. Air is supplied to entrance 23 at suitable pressures which may be in the range of about 2 to 6 inches of water. The air having a rotating motion imparted to it by the spiral path through the space between the vessel wall and jacket passes through air ports 15 with a rotating motion in addition to the tangential direction imparted by the tangential arrangement of ports 15 with respect to the longitudinal axis of the oxidation chamber. When liquid fuel is used supplemental air may be provided through gas ports 18 to provide sufficient air for combustion. Thus, the air may enter the oxidation chamber at pressures in the range of about 1 to 4 inches of water and in tangential streams with rotation of the air within each stream. This motion provides intimate mixing and energy exchange between the air, waste and fuel, thereby affecting efficient oxidation of the waste.

Fuel is provided in the gaseous form to gas ports 18 or in the liquid form to liquid ports 16 (from a fuel source not shown) in sufficient quantity to insure complete combustion within chamber 10. Liquid and gaseous fuels are suitable for the process and apparatus of this invention. Any fuel having sufficiently high energy to effect substantially complete oxidation of the waste material is suitable for use in the apparatus of this invention and may be supplied to the introduction ports by any fuel supply means known to the art. It is preferred to use natural gas as the fuel although other natural or synthetic fuels are suitable including a wide range of fuel oils, heavy or light, kerosene and the like.

The waste to be oxidized may be supplied to the gaseous or liquid introduction ports, as suitable, by any appropriate means. The waste may be in the form of gas, liquid or solids, and may be mixtures of any such forms. The waste may be of sufficiently high energy to support combustion and thus promote oxidation, or it may be of low energy which requires the transfer of energy from fuel to promote oxidation. When liquid or gaseous waste which supports combustion is used, supplementary fuel may not be necessary. The ratio of waste feed to fuel feed is governed by the required energy transfers necessary for oxidation of waste material. When liquid wastes are used, it is desired that they be atomized in introduction to the oxidation chamber. Suitable atomizing nozzles are well known in the art. When solid wastes are used, it is preferred that such solid material be finely divided and suspended in liquid slurry for introduction into the oxidation chamber. Such slurry formation of solids is well known and the liquid vehicle may be any suitable liquid such as one which will support combustion such as fuel oil or it may be a liquid which will not support combustion such as water. The process and apparatus of this invention has been found to efficiently burn and oxidize solid wastes in slurry form wherein the slurry is 90 weight percent water.

The amount of air introduced into the oxidation chamber is in excess of the air necessary for oxidation and combustion so that the periphery of the oxidation chamber will continuously be filled with circulating air to cool the inner surface of the refractory material.

The air ports are arranged in a tangential fashion so that the air stream will make multiple revolutions in its spiral passage through the combustion chamber. The tangential air ports must also be so arranged as to direct the air into intimate mixing relationship with the incoming fuel and waste chemical. The high volume, low pressure operation of the oxidation chamber and the introduction of the air, fuel and waste chemical causes intimate mixing, spiral rotating motion within the oxidation chamber to effect high efficiency oxidation of the waste chemical and combustion of the fuel in the central portion of the oxidation chamber while maintaining excess air moving spirally in the peripheral portion of the oxidation chamber. When the waste chemical is a combustible liquid or gas, the waste chemical may be mixed with fuel and such mixture introduced with the fuel.

The air ports, gas ports, and liquid ports each may contain means for introduction of the materials into the oxidation chamber in the manner specified above. The specific design of each of these ports or injection nozzles may be any suitable design for such purpose as is known in the art.

The open end of cylindrical oxidation chamber 13 is in communication with exhaust means generally shown as 32 for emission of the effluent of the oxidation chamber to the atmosphere. It is desirable to have an expansion chamber located between open end 13 and the final stack open to the atmosphere. It is desirable to pass the products of combustion from the exhaust of the combustion chamber into the expansion volume reducing the velocity of flow of the gases and causing particulate matter to settle to the bottom of the expansion chamber prior to passage into the final stack to the atmosphere. It is apparent that any pollution control device for removing undesired materials from the stack effluent which operates under low pressure conditions with high volume may be positioned between the exhaust from the combustion chamber and the stack to the atmosphere.

While my co-pending application, Ser. No. 289,095, is principally directed to incineration of undesired gaseous, fluid and solid wastes, this application is directed principally to the chemical oxidation of noxious or undesired waste gaseous, liquid and solid chemicals to non-polluting effluent gases and/or liquids and solids which may be readily separable from the gaseous effluent. An example of such thermal oxidation is shown in the oxidation of undesired ethyl acetate by the following reaction:

$$CH_3CO_2CH_2Ch_3+5O_2 \rightarrow 4CO_2+4H_2O.$$

Similarly, a wide range of materials may be thermally oxidized including acetonitrile, methylene chloride, ethanol, ethyl acetate, acetone, pyridine hydrochloride neutralized with sodium hydroxide, acetic acid, cuminic aldehyde, ethyl alcohol, methyl formate, chloroform, carbon tetrachloride, ether, isopropanol, isopropyl acetate, toluene, benzene, methanol, acetone, sodium bromide, sodium borate, sodium hydroxide, hydrochloric acid, pyridine oxalate, oxalic acid, hydrogen bromide, methyl bromide, tetrahydrofuran, benzyl chloride, lutidine, butenes, ammonium chloride, ammonium bromide phosphates, mixtures of saturated cyclic hydrocarbons (such as skellysolve B), hydrolized anisyl chloride and dianisyl compounds, benzyl chloride and latidine compounds, benzomorphan, tentazocines, ethylenediaminetetracetic acid (such as sequestrene AA), Ammonia, diisopropylamine and diisopropylamine HBr, dimethyl analine, isocyanates, ammonium sulphate, sodium sulphate, methylisobutyl ketone, xylene, isobutyl acetate, sodium chloride, magnesium dischloride, dimethylformamide, allyl chloride, allyl alcohol, ethyl ether, furfural, phenol, trichlorol butynol, pentane, ethane, and ethylene dichloride.

Any gaseous liquid or solid chemical which may be thermally oxidized to non-polluting amounts of gaseous effluent and/or any readily separable solids or liquids may be utilized in the process and apparatus of this invention.

A specific example of suitable thermal oxidation for the process and apparatus of this invention is in sewage treatment. The skimmings of flotation which are made up principally of oils and fats may be slurried with the digester sludges and introduced as a waste slurry to the apparatus of this invention and oxidized according to the process of this invention to effectively dispose of the liquid and solid wastes from sewage treatment plants.

The exhaust end of the oxidation chamber of the apparatus described above may be open directly to an effluent stack to the atmosphere if non-polluting gases are the sole product of oxidation of the waste and combustion of the fuel. However, frequently, the exhaust of the oxidation chamber contains particulate or undesired gaseous materials which must be removed. Any suitable apparatus which effectively removes such materials is satisfactory.

I have found particularly effective in removing both particulate and undesired gases from the exhaust of the oxidation chamber is the combination of the oxidation chamber with the liquid scrubber shown in FIG. 1. In use of the liquid scrubber in combination of the oxidation chamber I have found it particularly advantageous in many instances to utilize liquids containing chemicals for reaction with the undesired materials in the oxidation chamber exhaust. Where the exhaust from the oxidation chamber contains undesired materials which are readily solubilized in water or chemical solvents it is practical to solubilize such contaminants. However, in many cases the exhaust from the oxidation chamber contains chemicals which do not readily solubilize and must be further reacted by chemical reaction to result in non-polluting liquids and/or gases. In such cases the liquid scrubber may advantageously contain a chemical to promote such a reaction. For example, it may be desired to neutralize acids formed in the oxidation of waste chemicals in the oxidation chamber.

Briefly, referring to FIG. 1, the exhaust gas from the oxidation chamber passes through conduit 33 into liquid scrubber 40. Conduit 33 may contain any suitable energy recovery system to utilize the heat in the exhaust gases. The gas containing particulate matter and/or noxious gases enters the liquid scrubber in section 46 and the spray nozzles 41 remove the larger particulate matter to the bottom of section 46. The gas moves downwardly in section 46 as the spray from nozzles 41 increases its velocity and strikes the fluid in 46 at a relatively higher velocity. The greater portion of the remaining particulate matter is removed in the liquid by change of direction and relatively high velocity in passing beneath partition 42 into section 47. The gas rises through the liquid in section 47 at a relatively slower rate permitting solution or desired reaction of the noxious gases in the liquid and the treated gas stream then passes out of the liquid and upward countercurrent to the direction of liquid spray from nozzles 61 in section 47. The treated gas passes through the opening above the partition 43 into section 48 wherein the gas is passed through any desired demister and/or a packed column indicated as 44 through conduit 51 and forced by blower 52 driven by motor 53 up the clean effluent stack 54 to the atmosphere.

In order to provide an apparatus of the greatest versatility, that is which is applicable to the oxidation of a wide variety of chemical wastes, effluent stack 30 may be provided to the open atmosphere having shutter 31 open and shutter 34 closed for passage of effluent gases directly from the oxidation chamber to atmosphere. As pointed out above, the oxidation of some chemicals results directly in gases which may be passed to the atmosphere without further treatment. For use in such applications, the gases are advantageously directed through stack 30. For use in oxidations resulting in gases and particulate matter which require further treatment such as the liquid scrubber 40, shutter 31 is closed and shutter 34 is opened directing the gaseous exhaust from the oxidation chamber through liquid scrubber 40. Stack 30 is also useful as a fail-safe system permitting uninterrupted operation of the oxidation chamber even in the event of a power failure or over-temperature conditions. The fail-safe system then diverts the flow of gases from the scrubbing systems directly to stack 30 by closing shutter 34 and opening shutter 31 to permit quick venting.

The oxidation chamber, scrubber and effluent stacks may be constructed from conventionally available materials, usual construction being steel casing lined with fire brick refractory materials where necessary. Any suitable materials may be used for the construction of the apparatus of this invention.

An ignition means for igniting the fuel of combustion is not shown in FIG. 1 but must be located within the combustion chamber in proximity to the introduction of fuel from the fuel ports. Any suitable ignition means may be used, electric ignition means being preferred.

It is seen from the prior description that my process for thermal oxidation of gaseous, liquid and solid chemical wastes comprises the steps of pre-heating an air stream; introducting the pre-heated air stream tangentially into a cylindrical oxidation chamber so that the air stream moves as a swirling mass in a spiral and rotating motion to the exhaust end of the oxidation chamber and forms an air layer along the side wall of the oxidation chamber; introducing fuel into said swirling mass for combustion through the feed end of the oxidation chamber; igniting the introduced fuel; introducing chemical waste into said swirling mass through the feed end of the oxidation chamber; maintaining relative amounts of air, fuel and chemical waste in said swirling mass sufficient to effect oxidation of the introduced waste, combustion of the fuel and to provide air in excess of the amount needed for said oxidation and combustion; passing the fuel, air and chemical waste through the oxidation chamber in an intimate mixing, spiraling, rotating motion at low pressure to effect high efficiency oxidation of the waste in the central portion of the combustion chamber while maintaining said air layer along the side walls of the oxidation chamber; and passing the products of oxidation and combustion and excess air from the oxidation chamber through an open exhaust end.

The following examples are illustrative of preferred embodiments of my invention.

EXAMPLE I

The thermal oxidation apparatus as shown in FIG. 1 without any scrubber and passing the exhaust from the oxidation chamber directly to the atmosphere was operated with liquid chemical waste from a chemical plant having the following analysis:

| Chemical | Volume Percent |
|---|---|
| Ethyl acetate | 76 |
| Ethyl alcohol | 16 |
| Methylene chloride | 2.1 |
| Acetonitrile | 1 |
| Sodium chloride | 1 |
| Water | 3.9 |

The liquid waste was delivered to the oxidation chamber at 350 gallons per hour and kerosene fuel was delivered at 150 gallons per hour. The total heat input rate was $50 \times 10^6$ BTU per hour. The undesired liquid wastes were completely oxidized in the oxidation chamber according to the following reactions:

Ethyl acetate $$CH_3CO_2CH_2CH_3+5O_2 \rightarrow 4CO_2+4H_2O$$

Ethyl alcohol $$CH_3CH_2OH+3O_2 \rightarrow 2CO_2+3H_2O$$

Methylene chloride $$CH_2CL_2+O_2 \rightarrow CO_2+2HCl$$

Acetonitrile $$4CH_3CN+15O_2 \rightarrow 8CO_2+6H_2O+4NO_2$$

The stack gas was measured and analyzed generally following Federal EPA test procedures (Federal Register, Vol. 36, No. 247 Part II, Dec. 23, 1971) showing the following properties:

| | |
|---|---|
| Temperature, Average | 1030°F. |
| Velocity, Average | 25.85 feet per second |
| Volume (Dry basis) | $5.49 \times 10^5$ standard cubic feet per hour |
| Moisture | 6.314% |
| Particle Concentration (dry basis) | 0.03774 grains per standard cubic foot |
| (Corrected to | 12% $CO_2$ 0.1332) |
| Isokinetic Ratio | 95.91% |
| $CO_2$ | 3.4 volume percent |
| $O_2$ | 16.6 volume percent |
| $SO_2$ | 2.94 pounds per hour |
| $SO_3$ | 0.90 pounds per hour |
| $NO_x$ | 8.19 pounds per hour |
| HCl | 14.33 pounds per hour |
| Excess Air Ratio | 3.69 |

EXAMPLE II

The thermal oxidation apparatus as shown in FIG. 1 without any scrubber and passing the exhaust from the oxidation chamber directed to the atmosphere was operated utilizing a high BTU liquid waste as fuel to oxidize a low BTU liquid waste which would not support combustion. The high BTU liquid waste used as fuel had the following analysis:

| Chemical | Volume Percent |
|---|---|
| Acetone | 36.8 |
| Methyl alcohol | 9.2 |
| Methylisobutylketone | 4.6 |
| Xylene | 41.4 |
| Water | 8.0 |

The low BTU waste had the following analysis:

| Chemical | Volume Percent |
|---|---|
| Acetone | 15 |
| Methyl alcohol | 5 |
| Methylisobutylketone | 1 |
| Water | 77 |
| Residue | 2 |

The liquids were fed to the oxidation chamber through a five-nozzle cluster in the center of the feed end of the chamber, two nozzles being used for the high BTU liquid and three nozzles for the low BTU liquid. The high BTU liquid waste was delivered to the oxidation chamber at 240 gallons per hour and the low BTU liquid waste was delivered to the oxidation chamber at 800 gallons per hour. The total heat input rate was 40 $\times 10^6$ BTU per hour. The undesired liquid wastes were completely oxidized in the oxidation chamber according to the following reactions:

Acetone $C_3H_6O+4O_2 \rightarrow 3CO_2+3H_2O$

Methyl alcohol $CH_3OH+{}^3/_2O_2 \rightarrow CO_2+2H_2O$

Methylisobutylketone $C_6H_{12}O+{}^{17}/_2O_2 \rightarrow 6CO_2+6H_2O$

Xylene $C_8H_{10}+{}^{21}/_2O_2 \rightarrow 8CO_2+5H_2O$

Residue (Assuming Benzene)

$C_6H_6+{}^{15}/_2O_2 \rightarrow 6CO_2+3H_2O$

The stack gas was measured and analyzed generally following Federal EPA test procedure (Federal Register, Vol. 36, No. 247 Part II, Dec. 23, 1971) showing the following properties:

| | |
|---|---|
| Temperature, Average | 1335°F. |
| Velocity, Average | 36 feet per second |
| Volume (Dry basis) | 5.80 $\times 10^5$ standard cubic feet per hour |
| Moisture | 17.4% |
| Particle Concentration (dry basis) | .0335 grains per standard cubic foot |
| (Corrected to | 12% $CO_2$ .0556) |
| Isokinetic Ratio | 106% |
| $CO_2$ | 7.23 volume percent |
| $O_2$ | 12.87 volume percent |
| $N_2$ | 80.9 volume percent |
| $SO_2$ | 0.116 pounds per hour |
| $SO_3$ | Less than 0.05 pound per hour |
| $NO_x$ | 4.35 pounds per hour |
| HCl | 0.117 pounds per hour |

-Continued

| | |
|---|---|
| Unburnt Hydrocarbons | 45.6 ppm |
| Ash: | |
| High BTU waste | 24 ppm |
| Low BTU waste | 28 ppm |
| Particle size | Less than one micron |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for thermal oxidation of gaseous, liquid and solid chemical wastes comprising:

pre-heating an air stream;

introducing the pre-heated air stream tangentially into a cylindrical oxidation chamber so that the air stream moves as a swirling mass in a spiral and rotating motion to the exhaust end of the oxidation chamber and forms an air layer along the side wall of the oxidation chamber;

introducing fuel into said swirling mass for combustion through the feed end of the oxidation chamber;

igniting the introduced fuel;

introducing chemical waste into said swirling mass through the feed end of the oxidation chamber;

maintaining relative amounts of air, fuel and chemical waste in said swirling mass sufficient to effect oxidation of the introduced waste, combustion of the fuel and to provide air in excess of the amount needed for said oxidation and combustion;

passing the fuel, air and chemical waste through the oxidation chamber in an intimate mixing, spiraling, rotating motion at low pressure to effect high efficiency oxidation of the waste in the central portion of the combustion chamber while maintaining said air layer along the side walls of the oxidation chamber; and passing the products of oxidation and combustion and excess air from the oxidation chamber through an open exhaust end.

2. The process of claim 1 wherein said fuel is gaseous and introduced through gas ports spaced about the central portion of the feed end.

3. The process of claim 1 wherein said fuel is liquid and introduced through a central liquid port.

4. The process of claim 1 wherein said waste is gaseous and introduced through gas ports spaced about the central portion of the feed end.

5. The process of claim 1 wherein said waste is liquid and introduced through a central liquid port.

6. The process of claim 1 wherein said chemical waste is combustible utilized as fuel.

7. The process of claim 1 wherein the air is introduced into the combustion chamber at a pressure of about 1 to 4 inches of water.

8. The process of claim 1 passing the products of oxidation from the exhaust of the oxidation chamber directly into an expansion volume thereby reducing the velocity of flow and causing particulate matter to settle toward the bottom of the expansion volume.

9. The process of claim 1 passing the products of oxidation from the exhaust of the oxidation chamber through a liquid scrubber prior to exhaust to the atmosphere.

10. The process of claim 1 wherein the exhaust of the oxidation chamber may be selectively passed from the oxidation chamber directly to the atmosphere or from the oxidation chamber through a liquid scrubber to the atmosphere.

11. An apparatus for oxidation of gaseous, liquid and solid wastes comprising:

a cylindrical oxidation vessel having one end closed and the other end open for exhaust of products of oxidation, said closed end having a central port for introduction of liquids, ports spaced about said central port for introduction of gases and tangential ports toward the periphery from the center of the closed end for introduction of air, said tangential ports positioned in the same tangential direction;

a spaced jacket surrounding jacket surrounding said oxidation vessel for its full length having an opening toward said open end of said oxidation vessel and baffles spirally spaced between the jacket and combustion vessel for the length of said vessel defining an air passage in communication with blower means at said opening and with said air ports and the other end;

blower means for introduction of air into said opening of said jacket;

ignition means to ignite the fuel of combustion; and supply means for furnishing fuel and chemical waste to their respective ports.

* * * * *

UNITED STATES PATENT OFFICE
CERTIFICATE OF CORRECTION

Patent No. 3,892,190 Dated July 1, 1975

Inventor(s) Peter S. Sharpe

It is certified that error appears in the above-identified patent and that said Letters Patent are hereby corrected as shown below:

The term of this patent subsequent to April 23, 1991, has been disclaimed.

Signed and Sealed this

*twenty-ninth* Day of *June 1976*

[SEAL]

*Attest:*

RUTH C. MASON
*Attesting Officer*

C. MARSHALL DANN
*Commissioner of Patents and Trademarks*